(12) United States Patent
Tachibana

(10) Patent No.: US 9,172,548 B2
(45) Date of Patent: Oct. 27, 2015

(54) COMMUNICATION APPARATUS, CONTROL METHOD AND STORAGE MEDIUM

(71) Applicant: CANON KABUSHIKI KAISHA, Tokyo (JP)

(72) Inventor: Hideaki Tachibana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 13/657,301

(22) Filed: Oct. 22, 2012

(65) Prior Publication Data

US 2013/0124737 A1 May 16, 2013

(30) Foreign Application Priority Data

Nov. 10, 2011 (JP) .................................. 2011-246860
Sep. 4, 2012 (JP) .................................. 2012-194410

(51) Int. Cl.

| H04L 12/00 | (2006.01) |
| H04L 29/00 | (2006.01) |
| H04N 1/00 | (2006.01) |
| H04N 1/327 | (2006.01) |
| G06F 3/12 | (2006.01) |
| H04W 76/04 | (2009.01) |
| H04W 76/06 | (2009.01) |

(52) U.S. Cl.
CPC ................ H04L 12/00 (2013.01); G06F 3/128 (2013.01); G06F 3/1211 (2013.01); G06F 3/1236 (2013.01); H04L 29/00 (2013.01); H04N 1/00 (2013.01); H04N 1/00278 (2013.01); H04N 1/32786 (2013.01); H04N 1/32795 (2013.01); H04W 76/045 (2013.01); H04N 2201/0084 (2013.01); H04W 76/068 (2013.01)

(58) Field of Classification Search
None
See application file for complete search history.

(56) References Cited

U.S. PATENT DOCUMENTS

| 7,895,322 B2 | 2/2011 | Murakami | |
| 7,908,380 B1* | 3/2011 | Chu et al. ...................... | 709/227 |
| 2002/0099843 A1* | 7/2002 | Fruchtman et al. ........... | 709/232 |
| 2003/0088677 A1 | 5/2003 | Yamamoto | |
| 2004/0006625 A1* | 1/2004 | Saha et al. .................... | 709/227 |
| 2008/0201483 A1* | 8/2008 | Chong et al. .................. | 709/228 |
| 2008/0281973 A1* | 11/2008 | Yang ............................. | 709/228 |
| 2009/0089440 A1* | 4/2009 | Gathman ....................... | 709/228 |
| 2011/0119333 A1 | 5/2011 | Tamura | |
| 2011/0149092 A1 | 6/2011 | Yokota | |
| 2012/0084837 A1* | 4/2012 | Dhanakshirur ................... | 726/4 |

FOREIGN PATENT DOCUMENTS

JP  2010-109595 A  5/2010

* cited by examiner

*Primary Examiner* — Nicholas Taylor
*Assistant Examiner* — Clayton R Williams
(74) *Attorney, Agent, or Firm* — Fitzpatrick, Cella, Harper & Scinto

(57) ABSTRACT

A communication apparatus receives, from a first apparatus which has established a communication session, a signal indicating a state in which the communication session should be maintained. If the signal is not received from the first apparatus within a predetermined period of time while the communication session with the first apparatus is established, and a communication session establishment request is received from a second apparatus, the communication apparatus disconnects the communication session with the first apparatus.

11 Claims, 11 Drawing Sheets

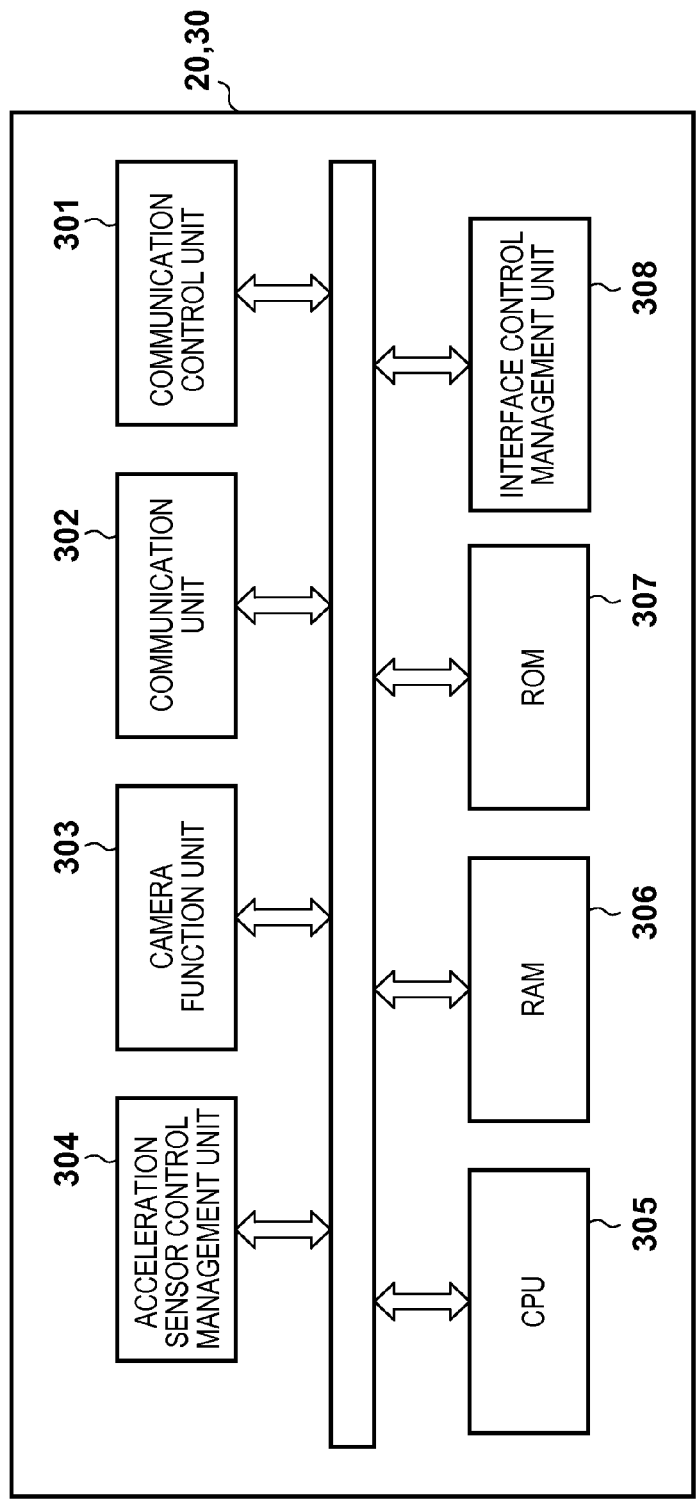

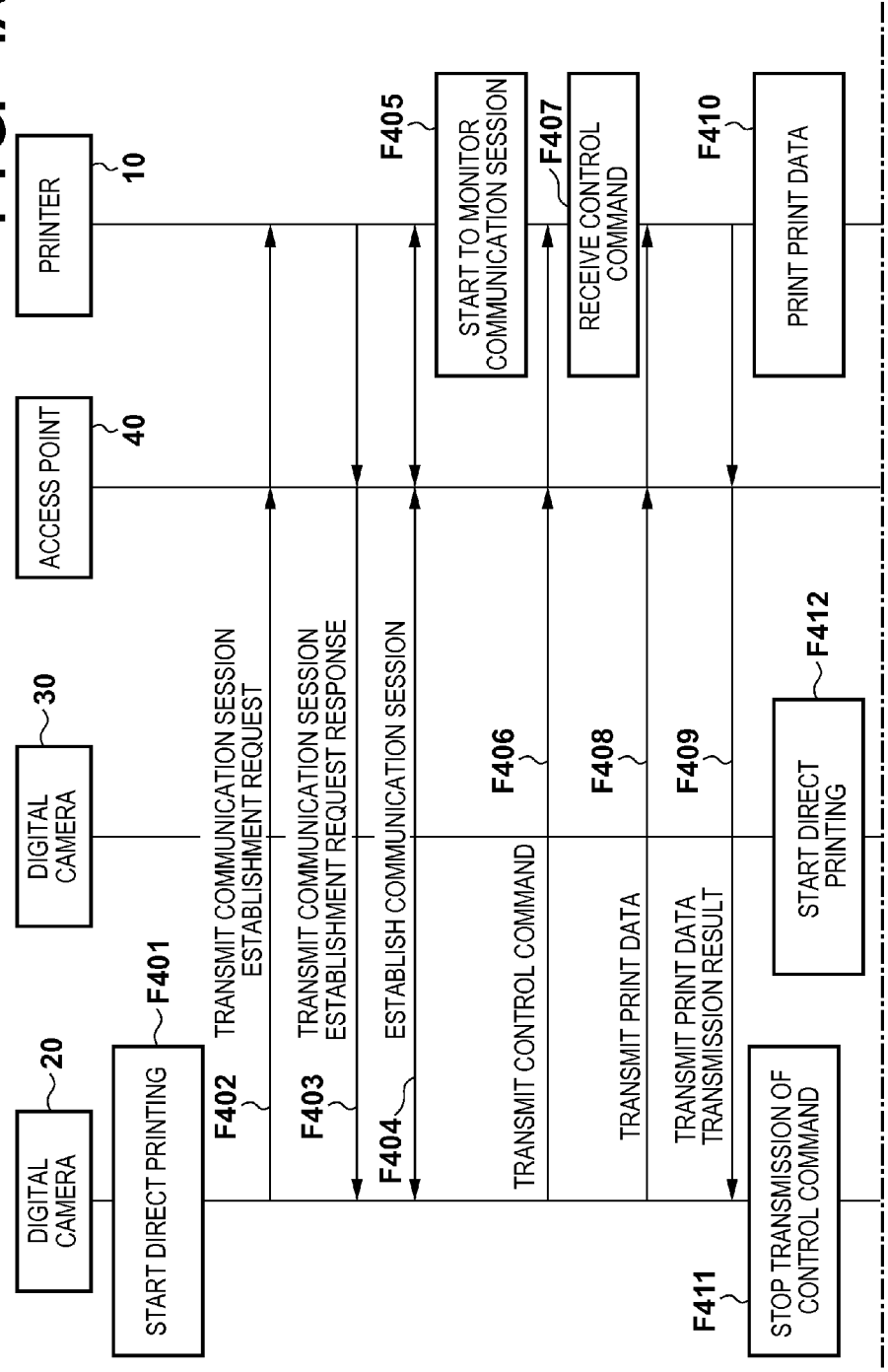

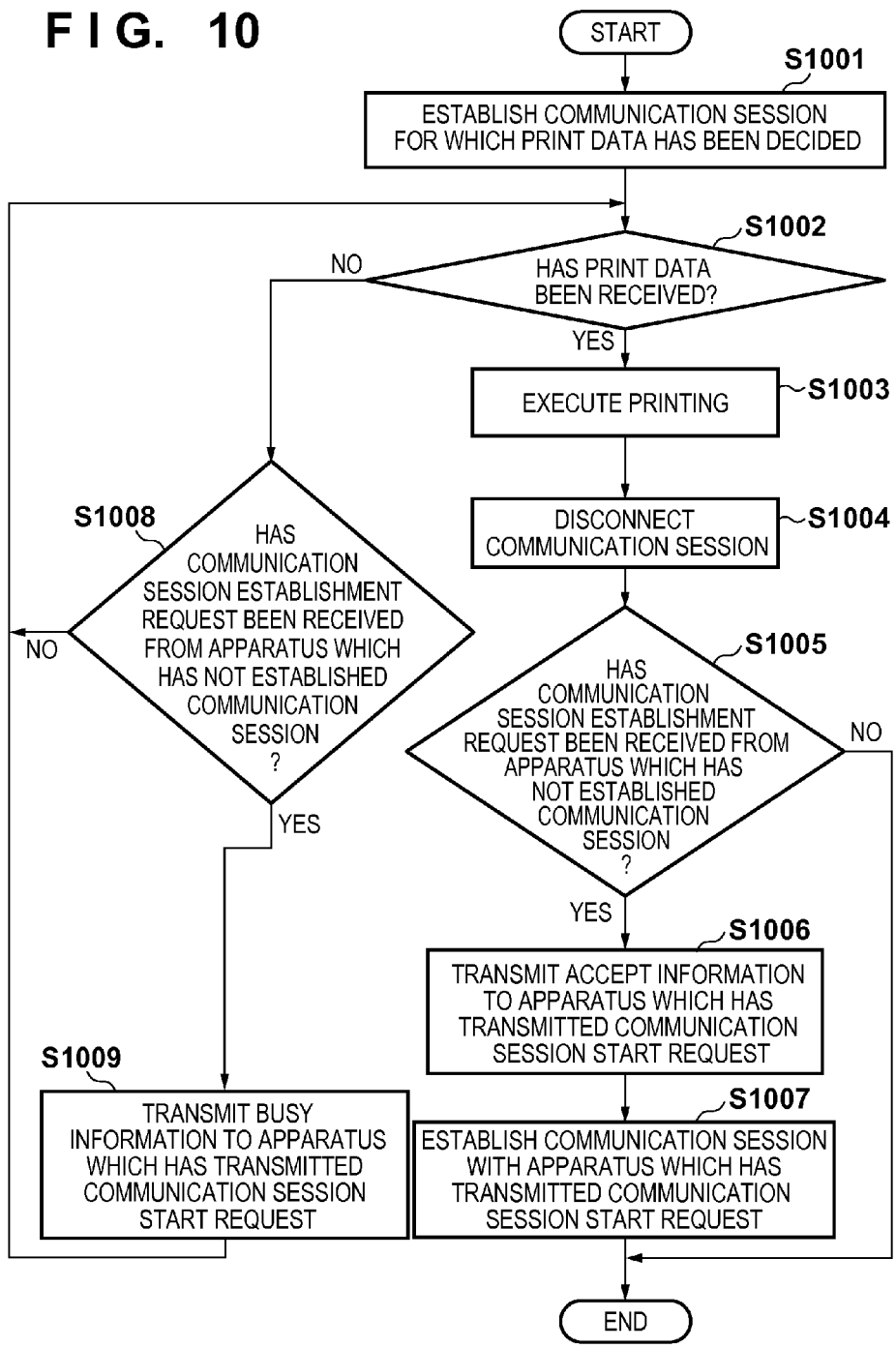

COMMUNICATION APPARATUS, CONTROL METHOD AND STORAGE MEDIUM

BACKGROUND OF THE INVENTION

1. Field of the Invention

The present invention relates to a communication apparatus, a control method, and a storage medium for controlling to establish and disconnect a communication session for data transmission/reception.

2. Description of the Related Art

There is well known PTP-IP (PTP over TCP/IP) as a protocol for connecting PTP (Picture Transfer Protocol) and TCP (Transfer Control Protocol). Japanese Patent Laid-Open No. 2010-109595 describes a technique of performing direct printing with wireless connection using PTP-IP without using a USB (Universal Serial Bus). Japanese Patent Laid-Open No. 2010-109595 also describes a technique in which the operation of a printer serving as an image output apparatus is guaranteed in an apparatus for performing direct printing with wireless connection even if a digital camera serving as an image input apparatus disconnects connection with the printer before the printer disconnects the connection.

Japanese Patent Laid-Open No. 2010-109595 assumes that the digital camera disconnects connection, and does not describe a disconnection control operation on the printer side. On the other hand, in an apparatus for performing direct printing with wireless connection, a plurality of communication sessions for transmitting/receiving print data may not simultaneously be established due to restrictions imposed by the apparatus and a protocol. In this case, if a printer cannot disconnect a communication session with a digital camera, one digital camera may occupy the communication resources of the printer, thereby occupying the printing resources as well.

The present invention has been made in consideration of the above problems, and provides a technique for preventing a partner apparatus such as a digital camera from occupying the communication resources of a communication apparatus such as a printer, and resources for executing an application such as printing.

SUMMARY OF THE INVENTION

According to one aspect of the present invention, there is provided a communication apparatus comprising: a reception unit configured to receive, from a first apparatus which has established a communication session, a signal indicating a state in which the communication session should be maintained; and a control unit configured to disconnect the communication session with the first apparatus, if the signal is not received from the first apparatus within a predetermined period of time while the communication session with the first apparatus is established, and a communication session establishment request is received from a second apparatus.

According to one aspect of the present invention, there is provided a communication apparatus comprising: an establishment unit configured to establish a communication session for transmitting/receiving data to/from a communication partner apparatus; a determination unit configured to determine whether a user operation has been performed; and a transmission unit configured to transmit, to the partner apparatus, if the determination unit determines that a user operation has been performed while the communication session with the partner apparatus is established, a signal indicating a state in which the communication session should be maintained.

According to one aspect of the present invention, there is provided a control method for a communication apparatus, comprising: receiving, from a first apparatus which has established a communication session, a signal indicating a state in which the communication session should be maintained; and disconnecting the established communication session, if the signal is not received from the first apparatus within a predetermined period of time while the communication session with the first apparatus is established, and a communication session establishment request is received from a second apparatus.

According to one aspect of the present invention, there is provided a control method for a communication apparatus, comprising: determining whether a user operation has been performed; and transmitting, to a partner apparatus, if a user operation is performed while a communication session with the partner apparatus is established, a signal indicating a state in which the communication session should be maintained.

Further features of the present invention will be apparent from the following description of exemplary embodiments with reference to the attached drawings.

BRIEF DESCRIPTION OF THE DRAWINGS

FIG. 3 is a block diagram showing an example of the functional block configuration of a digital camera incorporating the present invention;

FIGS. 4A and 4B illustrate a sequence chart showing processing between the printer and a plurality of digital cameras according to the first embodiment;

FIG. 10 is a flowchart illustrating the operation of the printer according to the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Although a case in which a wireless LAN system complying with the IEEE802.11 series is used will be described below, a communication mode is not necessarily limited to a wireless LAN complying with the IEEE802.11 series.

<<First Embodiment>>

(Network Configuration)

Figure 1:
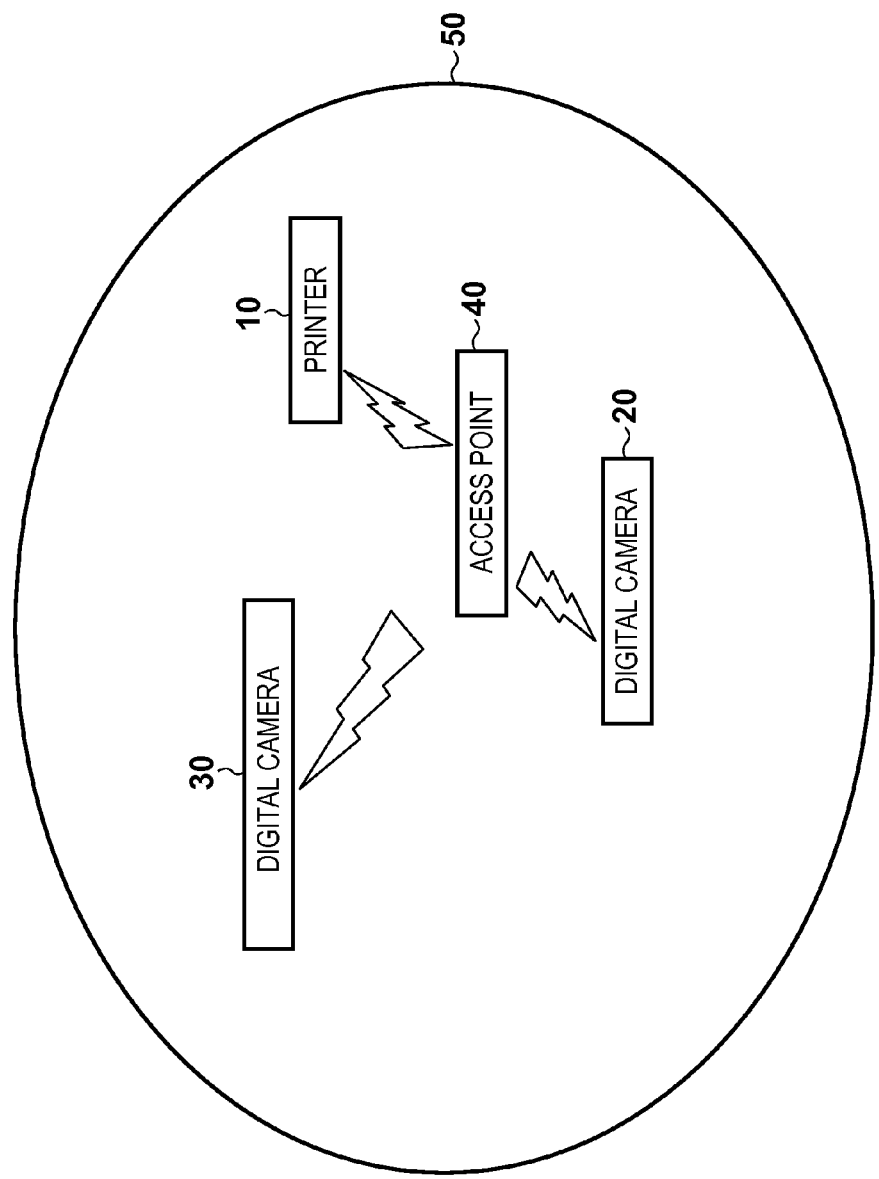
FIG. 1 is a schematic view showing a network configuration in which apparatuses are connected with each other according to the first, second, and third embodiments.

FIG. 1 is a schematic view showing a network configuration in which apparatuses are connected with each other according to this embodiment. Referring to FIG. 1, a printer 10 serving as an image output apparatus communicates with digital cameras 20 and 30 each serving as an image input apparatus, and prints out images acquired from the digital cameras 20 and 30. Assume that an access point 40 creates a network 50 in an infrastructure mode, and the printer 10 and the digital cameras 20 and 30 are connected with each other via the access point 40 by a wireless LAN. In this embodiment, a case in which the printer 10 is used as an image output apparatus and the digital cameras 20 and 30 are used as image input apparatuses will be described. The present invention, however, is not limited to this. For example, the image input apparatus may be a scanner or the like, and the image output apparatus may be a display or the like. The printer 10 and the digital cameras 20 and 30 can be considered as communication apparatuses for performing communication. In the following description, the function of the communication apparatus is mainly considered.

Note that the printer 10 and the digital cameras 20 and 30 can perform direct printing via the access point 40. Although direct printing via the access point 40 in the network will be described in the embodiment, the apparatuses may be directly wirelessly connected with each other by an ad hoc network without the intervention of the access point 40. Although a case in which PTP-IP (Picture Transfer Protocol over TCP/IP) is used as a printing protocol for performing direct printing will be described in the embodiment, the present invention is not limited to this. For example, FTP (File Transfer Protocol) may be used.

A case in which after the printer 10 and the digital camera 20 establish a communication session for performing direct printing via the access point 40, the digital camera 30 requests the printer 10 to establish a communication session will be described below.

(Configuration of Printer)

Figure 2:
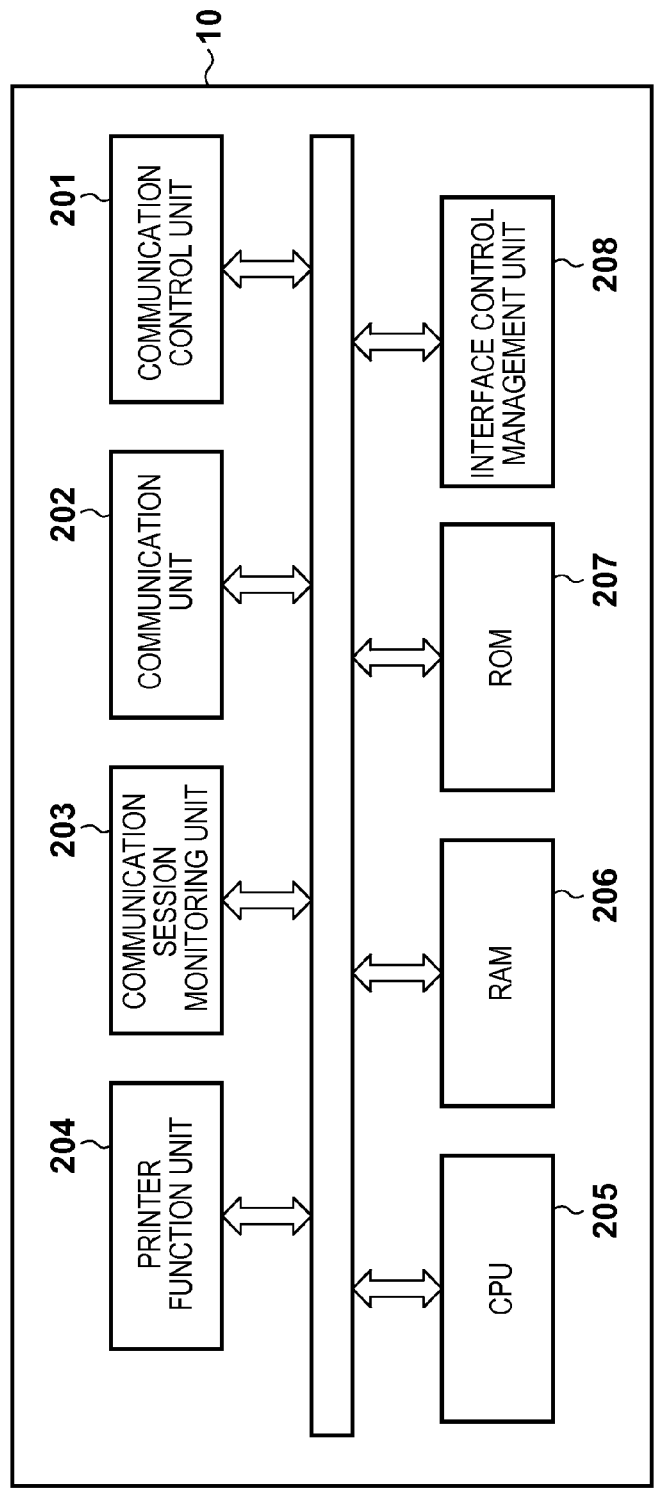
FIG. 2 is a block diagram showing an example of the functional block configuration of a printer incorporating the present invention.

FIG. 2 is a block diagram showing the configuration of the main part of the printer according to the embodiment. As shown in FIG. 2, the printer 10 includes, for example, a communication control unit 201, a communication unit 202, a communication session monitoring unit 203, a printer function unit 204, a CPU 205, a RAM 206, a ROM 207, and an interface control management unit 208.

The communication control unit 201 controls and manages establishment and disconnection of communication sessions in a lower communication layer such as a wireless LAN and a higher communication layer such as TCP/IP, PTP, and PTP-IP in the communication unit 202. Under the control of the communication control unit 201, the communication unit 202 performs wireless communication with another apparatus, for example, the digital camera 20 or 30, or the access point 40.

The communication control unit 201 controls the communication unit 202 to establish a communication path using wireless connection with the digital camera 20 or 30 via the access point 40. The communication control unit 201 uses a printing protocol on the established communication path to transmit/receive print images to/from the digital camera 20 or 30. Furthermore, if the printer side disconnects the communication session, the communication control unit 201 notifies, via the communication unit 202, a partner apparatus of a reason for the disconnection or information necessary for reconnection of the communication session (for example, information about a communication session restart time). The communication control unit 201 also controls the communication session monitoring unit 203 to monitor the state of the communication session. The state of the communication session is monitored by receiving a control command transmitted from the partner apparatus.

The printer function unit 204 controls various printer functions necessary for printing. The various printer functions include an image processing control operation, an operation of controlling feeding and discharging of a printer paper sheet, and a printer print control operation. The printer function unit 204 controls a print engine (not shown), and manages processing of printing image data received by the communication unit 202. The printer function unit 204 also manages the state of print processing such as an idle or execution state.

The CPU 205 controls the printer 10 as a whole. The RAM 206 is used as a work area by the CPU 205. The ROM 207 stores programs such as a processing procedure executed by the CPU 205. The interface control management unit 208 controls a user interface (not shown) for accepting various user operations to display or execute an application, and controls a communication interface (not shown) such as a USB, IEEE1394, or wireless LAN interface.

(Configuration of Digital Camera)

FIG. 3 is a block diagram showing the configuration of the main part of the digital camera 20 or 30 according to the embodiment. As shown in FIG. 3, the digital camera 20 or 30 includes a communication control unit 301, a communication unit 302, a camera function unit 303, and an acceleration sensor control management unit 304. The digital camera 20 or 30 also includes a CPU 305 for controlling the apparatus as a whole, a RAM 306 which is used as a work area by the CPU 305, and a ROM 307 storing programs such as a processing procedure executed by the CPU 305. Furthermore, the digital camera 20 or 30 includes an interface control management unit 308 which controls a user interface (not shown) for accepting various user operations to display or execute an application, and controls a communication interface (not shown) such as a USB, IEEE1394, or wireless LAN interface.

The communication control unit 301 controls and manages establishment and disconnection of communication sessions in a lower communication layer such as a wireless LAN and a higher communication layer such as TCP/IP, PTP, and PTP-IP in the communication unit 302. Under the control of the communication control unit 301, the communication unit 302 performs wireless communication with another apparatus, for example, the printer 10 or access point 40.

The communication control unit 301 controls the communication unit 302 to establish a communication path using wireless connection with the printer 10 via the access point 40. The communication control unit 301 uses a printing protocol on the established communication path to transmit/receive a print image to/from the printer 10. Furthermore, if the communication control unit 301 receives, via the communication unit 302, a reason for communication session disconnection or information necessary for reconnection of a communication session (for example, a processing procedure associated with a communication session reconnection request, and a communication session restart time) sent by the printer 10. The communication control unit 301 also transmits a control command for notifying the printer 10 of the state of the communication session via the communication unit 302. The control command is, for example, regularly transmitted by the digital camera 20 or 30 when the user is operating a print application. Note that when the digital camera 20 or 30 is not in a power saving state, or an acceleration sensor detects a change in tilt of the apparatus, the digital camera 20 or 30 may determine that the user is performing operation, and transmit the control command. Note that although a signal to be used for a communication session state notification and state management is used as an example of the control command in this description, another predetermined signal such as a notification signal may be used.

The camera function unit 303 controls various functions necessary for the digital camera. The various functions necessary for the digital camera include, for example, functions of controlling various image processes such as an image capturing control operation, and encoding and decoding of an image. The camera function unit 303 may also determine and control whether to cause the digital camera 20 or 30 to transit to a power saving mode. If, for example, it is detected that no user operation is executed for a given period of time, the camera function unit 303 may cause the digital camera 20 or 30 to transit to a power saving mode. The acceleration sensor control management unit 304 determines whether the user is performing an operation, by determining whether the change amount of tilt which has been detected by the digital camera 20 or 30 using a gyroscope or the like is equal to or larger than a predetermined amount.

Note that the functional block diagrams of the printer 10 and the digital camera 20 or 30 only shows one embodiment, and it is not necessary to have all the above-described functional blocks. For example, the digital camera 20 or 30 need not include the acceleration sensor control management unit 304. Some of the above-described functional blocks may be implemented by hardware components and the remaining blocks may be implemented by software components. Alternatively, dedicated hardware components may be prepared to implement all the functional blocks.

(Operation of Printer and Digital Camera)

Figure 4B:
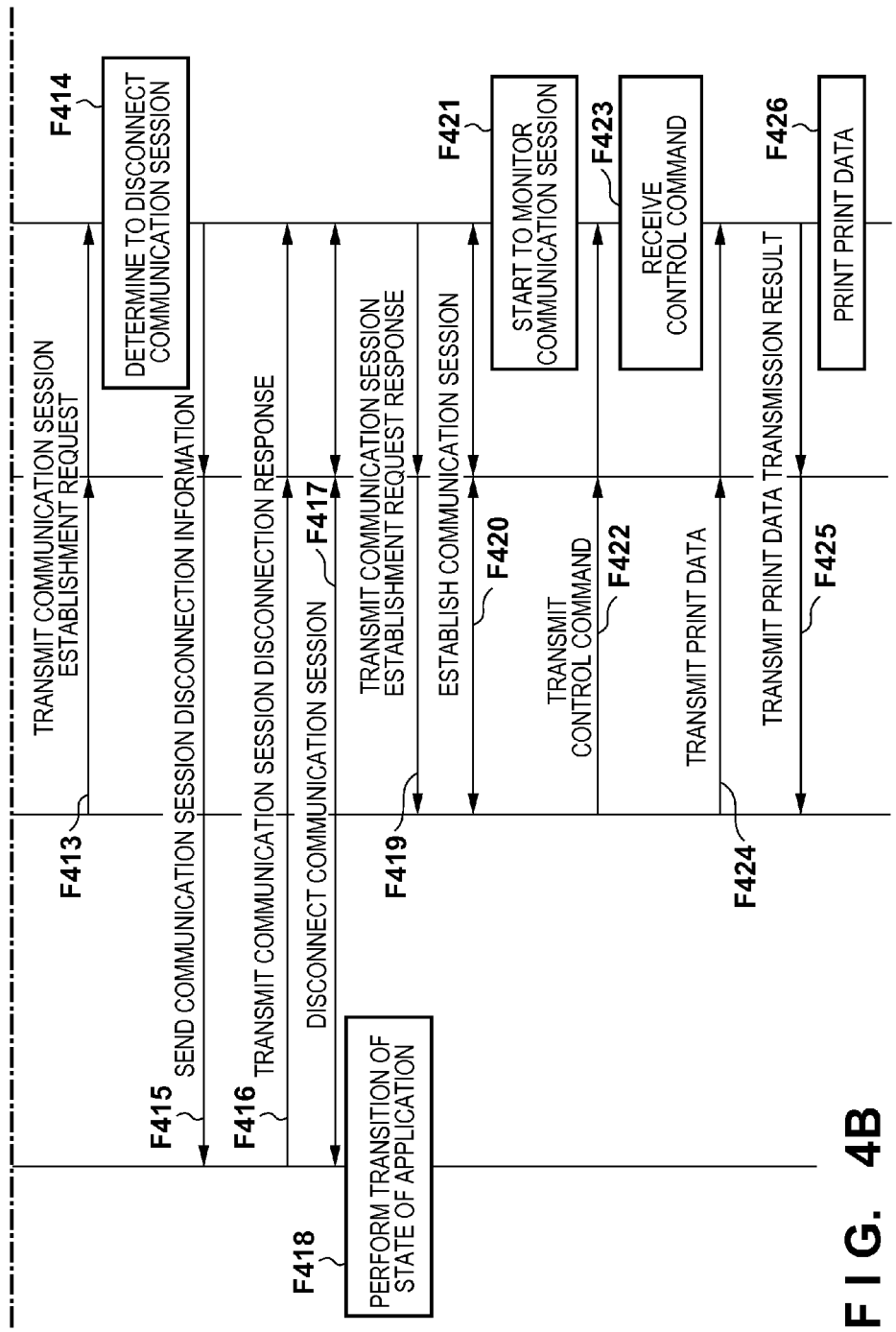

An operation of establishing and disconnecting a communication session between the printer 10 and the digital camera 20 or 30 will be described with reference to a sequence chart shown in FIGS. 4A and 4B. Referring to FIGS. 4A and 4B, the printer 10 and the digital camera 20 establish a communication session for performing direct printing via the access point 40. The interface control management unit 308 of the digital camera 20 accepts a user operation for starting to use direct printing, and starts direct printing (F401). Note that the interface control management unit 308 notifies the communication control unit 301 that a user operation has been accepted and direct printing is to start. To establish a communication path for transmitting/receiving print data, the communication control unit 301 controls the communication unit 302 to transmit a communication session establishment request to the printer 10 (F402).

Note that in this embodiment, each of the printer 10 and digital cameras 20 and 30 has already established wireless LAN connection with the access point 40. At this time, however, wireless LAN connection need not have been established, and connection in the lower communication layer such as a wireless LAN and the higher communication layer such as TCP/IP, PTP, or PTP-IP may be collectively established in response to a communication session establishment request. Although a communication session indicates PTP-IP connection in this embodiment, other communication protocols may be used.

When the communication unit 202 of the printer 10 receives the communication session establishment request (F402) from the digital camera 20, the communication control unit 201 of the printer 10 returns a communication session establishment request response to the digital camera 20 (F403). A communication session is then established between the digital camera 20 and the printer 10 (F404). After the communication session between the printer 10 and the digital camera 20 is established, the communication control unit 201 of the printer 10 controls the communication session monitoring unit 203 to start to monitor the state of the communication session (F405). Note that the communication session monitoring unit 203 monitors the state of the communication session by monitoring reception of a control command which is transmitted when it is indicated that the communication session is maintained.

On the other hand, the communication control unit 301 of the digital camera 20 controls the communication unit 302 to transmit the control command to the printer 10 (F406). If, for example, the user is operating a print application, the unit 301 transmits the control command at a predetermined time interval. If the user does not operate the application for a given period of time, the unit 301 stops transmitting the control command. That is, if the unit 301 regularly transmits the control command, the communication session is in a state in which the connection should be maintained. If the unit 301 does not transmit the control command, the communication session is in a disconnectable state. In this manner, it is possible to notify the printer 10 of the state of the communication session with the control command. Note that if the digital camera 20 is not in a power saving state, or the acceleration sensor control management unit 304 detects movement of the apparatus based on a change in tilt of the apparatus, it may be determined that the user is operating the application, thereby transmitting the control command.

The printer 10 causes the communication unit 202 to receive the control command transmitted from the digital camera 20, and causes the communication session monitoring unit 203 to detect it (F407). The communication session monitoring unit 203 of the printer 10 determines whether the established communication session is in use, that is, whether the communication session is in a disconnectable state, by determining whether the control command is received at the predetermined time interval.

The digital camera 20 transmits, to the printer 10 via the communication unit 302, image data (to be referred to as print data hereinafter) such as captured image data to be printed which has been selected by a user operation or the like (F408). The printer 10 receives the print data from the digital camera 20 via the communication unit 202, and notifies the digital camera 20 of a print data transmission result (F409). If the received print data can be printed, the printer 10 causes the printer function unit 204 to print the print data (F410). If the interface control management unit 308 no longer detects a user operation, for example, after completion of transmission of all print data, the digital camera 20 stops transmitting the control command (F411). Note that, if the communication control unit 301 regularly transmits the control command, the interface control management unit 308 may detect whether a user operation has been performed within the predetermined period of time before the control command transmission timing. If no user operation has been performed within the predetermined period of time before the transmission timing, the communication control unit 301 may not transmit the control command at the transmission timing.

A case in which the user of the digital camera 30 operates the digital camera 30 to start to use direct printing in this state will now be described. The interface control management unit 308 of the digital camera 30 accepts a user operation for starting to use direct printing, and starts direct printing (F412). Note that the interface control management unit 308 notifies the communication control unit 301 that the user operation has been accepted and direct printing is to start. To establish a communication path for transmitting/receiving print data, the communication control unit 301 of the digital camera 30 controls the communication unit 302 to transmit a communication session establishment request to the printer 10 (F413). A communication session establishment request may be transmitted upon start of a direct printing application, or may be transmitted after deciding data to be printed. In this embodiment, a case in which a communication session establishment request is transmitted upon start of a direct print application will be described. A case in which a communication session establishment request is transmitted after deciding data to be printed will be explained in the second embodiment.

When the communication unit 202 of the printer 10 receives the communication session establishment request (F413) from the digital camera 30, the communication control unit 201 of the printer 10 determines whether it has a currently established communication session. If the printer 10 has a currently established communication session, the communication session monitoring unit 203 determines whether the control command is continuously received at the predetermined time interval from the digital camera 20. Furthermore, the printer 10 monitors for the predetermined time interval whether the control command is received, and determines whether at least one control command has been received. If the communication control unit 201 of the printer 10 receives a communication session establishment request from another apparatus when the control command is not continuously received at the predetermined time interval or when no control command has been received within the predetermined period of time, it determines that the communication session may be disconnected. In this case, to deal with the communication session establishment request from the apparatus (digital camera 30) other than the partner apparatus (digital camera 20) with which the communication session has been established, it is decided to disconnect the established communication session (F414).

Note that if the control command has been received within the predetermined period of time, the communication control unit 201 refers to information about a communication protocol for the received communication session establishment request. The communication protocol information is used to determine whether it is possible to transfer print data according to the protocol immediately after a communication path for transmitting/receiving the print data is established. Details thereof will be described later in the second embodiment. A case in which no control command is received within the predetermined period of time will be described with reference to this sequence chart.

If it is decided to disconnect the communication session, the communication control unit 201 controls the communication unit 202 to inform the digital camera 20 of a reason for communication session disconnection or information necessary for reconnection of the communication session as communication session disconnection information (F415). The information necessary for reconnection of the communication session is, for example, information about a communication session restart time. The digital camera 20 receives the communication session disconnection information from the printer 10 via the communication unit 302, and returns a communication session disconnection response to the printer 10 via the communication unit 302 (F416). Upon receiving the communication session disconnection response (F416), the communication control unit 201 of the printer 10 disconnects the communication session (F417). The digital camera 20 performs transition of the state of the print application (F418). At this time, the digital camera 20 may refer to the communication session disconnection information received from the printer 10, and execute processing of restarting the communication session after a predetermined period of time elapses. In this case, the digital camera 20 sets a wireless communication function in a power saving state until the communication session restart time contained in the communication session disconnection information comes, and executes processing of reconnecting the communication session after the restart time. Furthermore, the digital camera 20 may stand by for the printer 10 to regularly polling a communication session establishment request, or may terminate the print application. If the printer 10 sends a communication session establishment request, the digital camera 20 may stand by for the request.

After disconnecting the communication session with the digital camera 20 (F417), the printer 10 returns a communication session establishment request response to the digital camera 30 via the communication unit 202 (F419). The digital camera 30 and the printer 10 establish a communication session (F420). When the communication session with the digital camera 30 is established, the printer 10 starts to monitor the state of the communication session using the communication session monitoring unit 203 (F421). The communication session monitoring unit 203 monitors the state of the communication session by monitoring reception of the control command which is transmitted when it is indicated that the communication session is maintained.

The communication control unit 301 of the digital camera 30 controls the communication unit 302 to transmit the control command to the printer 10 (F422). The control command is, for example, regularly transmitted at a predetermined time interval when the user is operating a print application. If no user operation is performed within a predetermined period of time, the unit 301 stops transmitting the control command. Note that if the digital camera 30 is not in a power saving state, or the acceleration sensor control management unit 304 detects movement of the apparatus by detecting a change in tilt of the apparatus, it may be determined that the user is operating the application, thereby transmitting the control command. Information indicating the state of the communication session may be added to a signal of the control command to be transmitted by the digital camera 30. For example, determination information indicating that the communication session is not maintained within a predetermined period of time, that no user operation is performed within the predetermined period of time, or the like may be contained in the signal of the control command. In this case, the printer 10 may analyze the received control command signal, and determine the state of the communication session based on an analysis result, that is, whether the communication session is in a state in which the connection should be maintained, or a disconnectable state.

The printer 10 receives, via the communication unit 202, the control command transmitted from the digital camera 30, and the communication session monitoring unit 203 detects the control command. The communication session monitoring unit 203 of the printer 10 determines whether the established communication session is in use, that is, whether the communication session is in a disconnectable state, by determining whether the control command is received at a predetermined time interval (F423).

The digital camera 30 transmits, to the printer 10 via the communication unit 302, print data which has been selected by a user operation or the like (F424). When the communication unit 202 receives the print data from the digital camera 30, the printer 10 transmits a print data transmission result to the digital camera 30 via the communication unit 202 (F425). If the received print data can be printed, the printer 10 causes the printer function unit 204 to print the print data (F426).

With the above operation, when the printer 10 communicates with the digital camera 20, it can identify the state of the communication session with the digital camera 20 (whether the communication session is in a disconnectable state), and disconnect the communication session on its own. This prevents the digital camera 20 from occupying the communication resources of the printer 10. Furthermore, by notifying the digital camera 20 of information such as a reason for the disconnection at this time, the digital camera 20 can execute a subsequent necessary control operation based on the received information. When the printer 10 disconnects the communication session on its own, it is possible to share the print resources of the printer 10 between the digital cameras 20 and 30.

(Operation of Printer)

Figure 5:
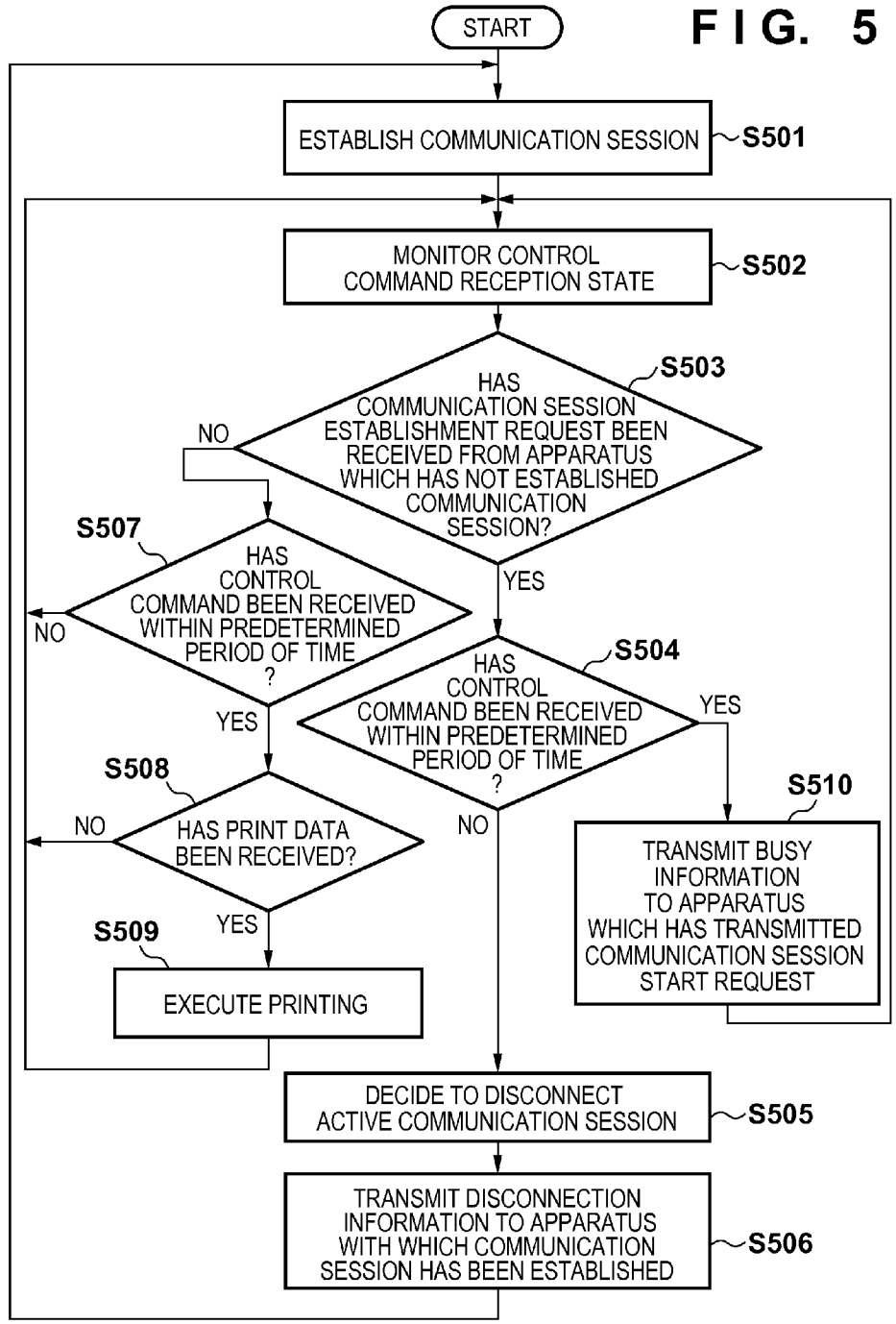
FIG. 5 is a flowchart illustrating the operation of the printer according to the first embodiment.

FIG. 5 is a flowchart illustrating the operation processing procedure of the printer 10 according to the embodiment. When the processing starts, the communication control unit 201 transmits a communication session establishment request response to a communication apparatus (the digital camera 20 in the embodiment) as the transmission source of a communication session establishment request via the communication unit 202. With this operation, the printer 10 establishes a communication session with the communication apparatus (digital camera 20) (step S501). After the communication session is established, the communication session monitoring unit 203 monitors the reception state of the control command transmitted from the digital camera 20 (step S502). That is, the communication session monitoring unit 203 determines whether the control command has been received via the communication unit 202. Note that the printer 10 can determine whether the established communication session is in use, that is, whether the communication session can be disconnected, by determining whether the control command has been received within a predetermined period of time.

On the other hand, the communication control unit 201 determines whether a communication session establishment request for establishing a communication path to be used to transmit/receive print data has been received via the communication unit 202 while monitoring the reception state of the control command (step S503). That is, the unit 201 determines whether a communication session establishment request has been received from an apparatus other than the partner apparatus with which the communication session has been established. If no communication session establishment request has been received (NO in step S503), the printer 10 determines whether the control command has been received within the predetermined period of time (step S507). If the control command has been received within the predetermined period of time (YES in step S507), the printer 10 determines whether print data has been received (step S508). If print data has been received (YES in step S508), the printer 10 performs printing (step S509). On the other hand, if no control command has been received within the predetermined period of time (NO in step S507), if no print data has been received (NO in step S508), or if print processing is complete (step S509), the process returns to monitoring of the reception state of the control command (step S502).

If the printer 10 has received a communication session establishment request (YES in step S503), the communication session monitoring unit 203 checks the reception state of the control command from the partner apparatus (digital camera 20) with which the communication session has been established (step S504). The printer 10 determines whether the established communication session is currently in use, by determining whether the control command has been received within the predetermined period of time. If no control command has been received within the predetermined period of time (NO in step S504), the printer 10 determines that the established communication session can be disconnected because it is not in use, and decides to disconnect the active communication session (step S505). In this case, the communication control unit 201 of the printer 10 informs the partner apparatus (digital camera 20) with which the communication session has been established of a reason for communication session disconnection or information necessary for reconnection of the communication session via the communication unit 202 (step S506). Note that the reason for the disconnection is sent as, for example, an error code indicating that no control command has been received or that a new communication session establishment request has been received. The information necessary for reconnection is, for example, information indicating whether reconnection is possible, or information about a time when reconnection becomes possible. Assume that the printer 10 has disconnected the currently established communication session. If the digital camera 30 sends a communication session establishment request in this state, the printer 10 establishes a communication session in response to the request (step S501).

On the other hand, if it is determined in step S504 that the control command has been received within the predetermined period of time (YES in step S504), the printer 10 transmits BUSY information to the apparatus (digital camera 30) which has transmitted the communication session start request (step S510), and refuses establishment of a communication session. Note that the BUSY information contains, for example, an error code indicating that it is impossible to establish a new communication session because the communication session is active. In the printer 10, after the communication control unit 201 transmits the BUSY information, the communication session monitoring unit 203 continues monitoring the control command (step S502).

With the above operation, if it can be determined that no control command has been received within the predetermined period of time from a partner apparatus with which a communication session has been established, and the active communication session is not in use, it is possible to free the communication resources for another apparatus by disconnecting the communication session. Furthermore, this can prevent one (the digital camera 20) of a plurality of apparatuses (the digital cameras 20 and 30) from wastefully occupying the resources of an apparatus (the printer 10) for communicating with the apparatuses. If the printer 10 disconnects the communication session, it is possible to decide the operation of the digital camera 20 to be subsequently executed by informing the digital camera 20 of a reason for the communication session disconnection or information necessary for reconnection of the communication session. This can prevent the operation of the digital camera 20 from becoming unstable.

(Operation of Digital Camera)

Figure 6:
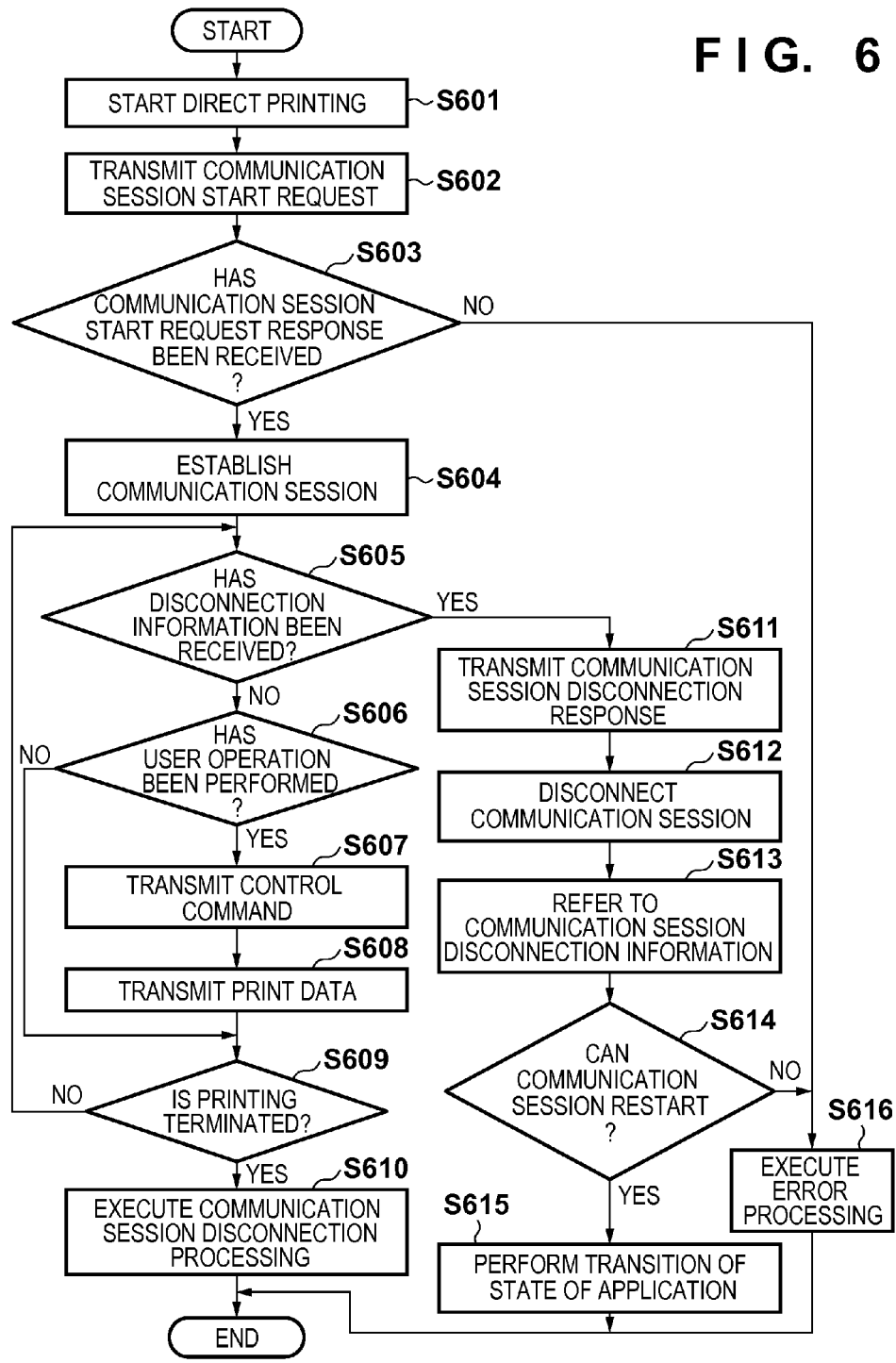
FIG. 6 is a flowchart illustrating the operation of the digital camera according to the first, second, and third embodiments.

FIG. 6 is a flowchart illustrating the operation processing procedure of the digital camera 20 according to the embodiment. When the user performs an operation for starting to use direct printing through the interface control management unit 308 of the digital camera 20, the processing starts (step S601). When the processing starts, the communication control unit 301 controls the communication unit 302 to transmit a communication session establishment request for establishing a communication path to be used to transmit/receive print data to/from the printer 10 (step S602). Note that a communication session establishment request may be transmitted upon start of a direct printing application (before deciding data to be printed), or may be transmitted after deciding data to be printed. In this embodiment, a case in which a communication session establishment request is transmitted upon start of a direct printing application will be described. A case in which a communication session establishment request is transmitted after deciding data to be printed will be explained in the second embodiment.

The communication control unit 301 determines whether a communication session establishment request response has been received from an opposing apparatus (the printer 10 in the embodiment) (step S603). If a communication session establishment request response has been received from the opposing apparatus (YES in step S603), a communication session is established (step S604). On the other hand, if no communication session establishment request response has been received from the opposing apparatus (NO in step S603), the digital camera 20 executes error processing (step S616). In the error processing, for example, the interface control management unit 308 displays an error on the user interface.

After the communication session is established (step S604), the communication control unit 301 determines whether communication session disconnection information has been received from the opposing apparatus (printer 10) (step S605). Note that the communication session disconnection information contains a reason for communication session disconnection and information necessary for reconnection of the communication session. The information necessary for reconnection of the communication session is, for example, information indicating a communication session restart time. If no communication session disconnection information has been received (NO in step S605), the interface control management unit 308 determines the state of a print application (step S606). Note that the determination of the state of the print application indicates, for example, determination whether the user is operating the application (for example, selecting print data to be printed). If the interface control management unit 308 determines that the user is operating the application (YES in step S606), the communication control unit 301 transmits the control command to notify the opposing apparatus that the communication session should be maintained (step S607). Note that if the digital camera 20 is not in a power saving state, or the acceleration sensor control management unit 304 detects a change in tile or movement of the apparatus, the unit 308 may determine that the user is operating the application (YES in step S606), and transmit the control command (step S607). After transmitting the control command to the opposing apparatus (printer 10), the communication control unit 301 transmits the print data to be printed to the opposing apparatus (step S608).

Note that the control command may be transmitted every time a user operation is executed, or may be regularly transmitted at a predetermined time interval. Note also that if the control command is regularly transmitted at the predetermined time interval, whether to transmit the control command may be determined depending on whether a user operation has been executed within the predetermined time interval until the transmission timing. That is, if no user operation has been detected within the predetermined time interval until the transmission timing, transmission of a control command may be stopped. This can prevent power from being unnecessarily consumed by transmitting the control command for each operation.

On the other hand, if the interface control management unit 308 determines that the user is not operating the application (NO in step S606), the digital camera 20 determines whether to terminate the print application (step S609). After transmitting the print data in step S608, the digital camera 20 also determines whether to terminate the print application (step S609). Based on whether a further user operation for the application has been detected, the interface control management unit 308 determines whether to terminate the print application. If, for example, a further user operation for the application has been detected after transmitting the print data, the digital camera 20 determines to continue the print application (NO in step S609). In this case, the digital camera 20 returns the process to determination of whether disconnection information has been received (step S605). On the other hand, if a user operation for the application is no longer detected after transmitting the print data, the digital camera 20 determines to terminate the print application (YES in step S609). The communication control unit 301 executes communication session disconnection processing (step S610).

Note that in the above description, if a user operation has been executed (YES in step S606), the control command is transmitted (step S607), and then print data is transmitted (step S608). The present invention, however, is not limited to this. If, for example, print data to be transferred has not been decided, print data transmission processing (step S608) may be omitted. In this case, after transmitting the control command (step S607), whether to terminate the print application is determined (step S609). If, for example, print data has not been selected, and the application is not terminated yet, whether disconnection information has been received is determined (step S605) and a user operation is monitored (step S606).

If it is determined in step S605 that communication session disconnection information has been received (YES in step S605), the communication control unit 301 transmits a communication session disconnection response (step S611). When the digital camera 20 transmits a communication session disconnection response, the communication session with the opposing apparatus (printer 10) is disconnected (step S612). The digital camera 20 refers to the communication session disconnection information received from the opposing apparatus (printer 10) (step S613). The communication session disconnection information contains an error code indicating that no control command has been transmitted, that a new communication session establishment request has been received, or the like, and information necessary for reconnection which indicates whether reconnection is possible, a time when reconnection becomes possible, or the like.

The communication control unit 301 determines based on the communication session disconnection information referred to whether it is possible to reconnect the communication session with the opposing apparatus (printer 10) (step S614). If it is determined that it is possible to reconnect the communication session with the opposing apparatus (printer 10) (YES in step S614), the digital camera 20 performs transition of the state of the print application (step S615). More specifically, the digital camera 20 causes the application to transit to a communication session reconnection mode, a print application end mode, a mode in which the application is executed in the background of another application, or the like. At this time, the digital camera 20 may execute communication session restart processing by referring to the communication session disconnection information received from the printer 10. For example, the digital camera 20 may be in a power saving state until the communication session restart time comes, and may execute communication session reconnection processing or the like after the restart time. The digital camera 20 may regularly poll a communication session establishment request, or may terminate the print application. On the other hand, if it is determined that it is impossible to reconnect the communication session (NO in step S614), the digital camera 20 executes error processing. In the error processing, for example, the interface control management unit 308 displays an error on the user interface (step S616).

Note that the communication session establishment request and control command described above may be, for example, a command to indicate the state of the communication session in the printer 10. In this case, if establishment of a new communication session is allowed, the communication session establishment request response from the printer 10 may contain information indicating it. Alternatively, if new communication is not allowed, an error code is transmitted, as described above. Furthermore, the printer 10 may always return a response to the control command. For example, if the printer 10 receives, as the control command from the digital camera 20, a command to indicate the state of the printer 10, and agrees to maintain the communication session, it may return a message indicating it to the digital camera 20. If the communication session is disconnected, disconnection information is transmitted, as described above. This enables the printer 10 and the digital camera 20 or 30 to always share information for maintaining and managing the communication session, thereby managing the communication session with higher accuracy.

With the above operation, after establishment of a communication session with the printer 10, the digital camera 20 can use the control command to notify the printer 10 of whether to maintain the communication session. This enables the printer 10 to free a communication session not in use for another apparatus (the digital camera 30) without unnecessarily maintaining the communication session. Upon receiving communication session disconnection information from the printer 10, the digital camera 20 extracts, from the received information, a reason for the communication session disconnection or information necessary for reconnection of the communication session, and performs transition of the state of an application for subsequent control by itself. With this processing, the digital camera 20 can identify its own situation, and decide a subsequent operation, even if the printer 10 disconnects the communication session. The digital camera 20 can thus execute an appropriate operation after the communication session is disconnected.

Note that although a case in which the digital cameras 20 and 30 transmit data to the printer 10 has been described above, the present invention is not limited to this. The embodiment is applicable to any network as long as it is assumed that a plurality of communication apparatuses are connected with one communication apparatus in the network. That is, if there is a partner apparatus (the digital camera 20) with which a communication session has been established, and another apparatus (the digital camera 30) transmits a communication session establishment request to a communication apparatus (the printer 10), this embodiment is applicable. Note that in a case except for communication between the digital camera 20 or 30 and the printer 10, the application need not be a print application, as a matter of course. In this case, the above-described partner apparatus or the other apparatus may determine whether the user operates the application associated with the communication session, and transmit the control command to the communication apparatus based on a determination result.

<<Second Embodiment>>

In the first embodiment, a communication session disconnection method when no control command is received within a predetermined period of time has been described. In the second embodiment, a communication session disconnection method according to information about a communication protocol for a received communication session establishment request will be explained. The communication protocol information is used to determine whether it is possible to transfer print data according to the protocol immediately after a communication path for transmitting/receiving print data is established.

Note that a network configuration, the configuration of a printer, and the configuration of a digital camera in this embodiment are the same as those in the first embodiment, and a description thereof will be omitted.

(Operation of Printer and Digital Camera)

Figure 7:
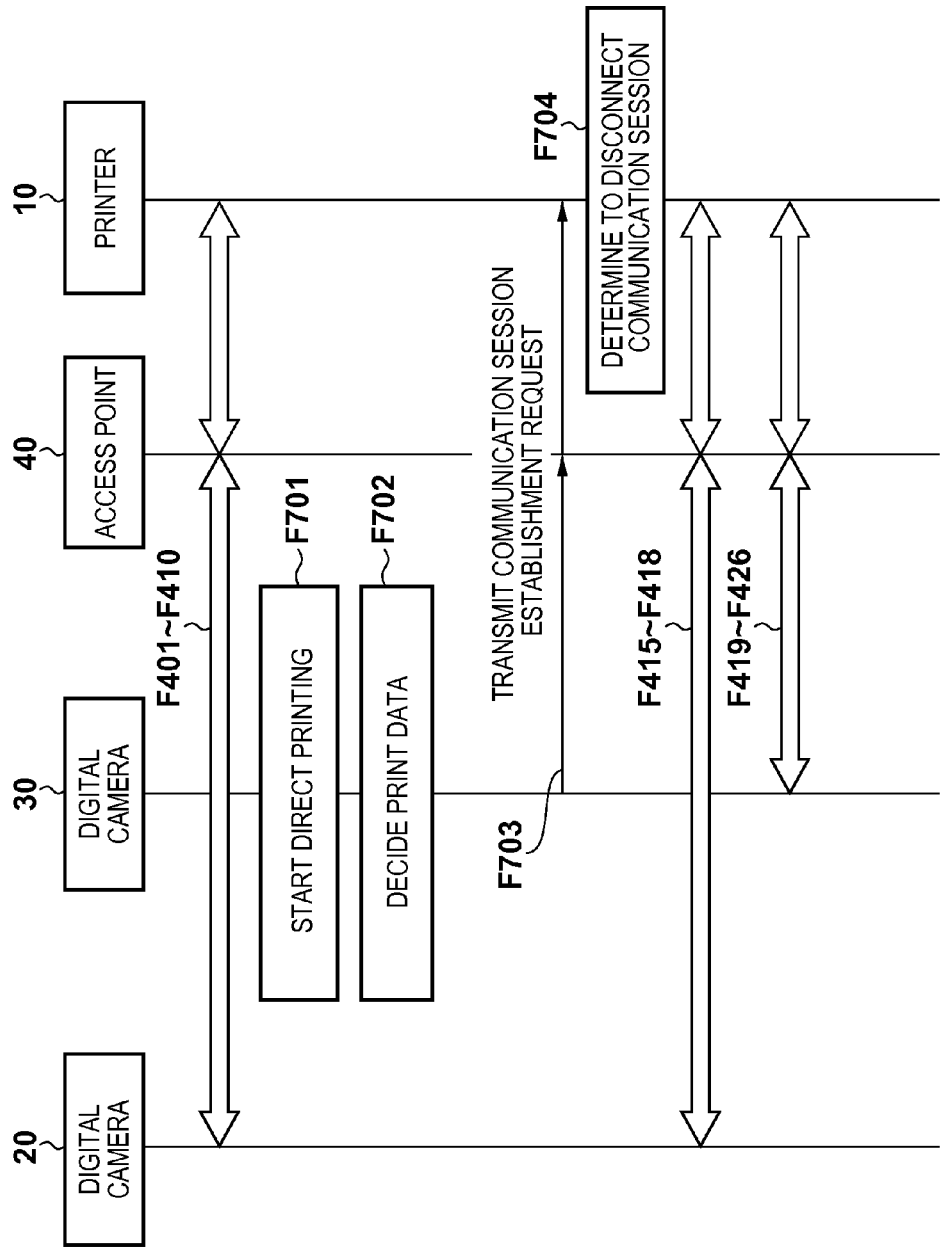
FIG. 7 is a sequence chart showing processing between a printer and a plurality of digital cameras according to the second embodiment.

An operation of establishing and disconnecting a communication session between a printer 10 and a digital camera 20 or 30 will be described with reference to a sequence chart shown in FIG. 7. Note that a processing sequence in F401 to F410 is the same as that in the first embodiment, and a description thereof will be omitted.

Assume that the digital camera 20 and the printer 10 have established a communication session, and the user of the digital camera 30 operates the digital camera 30 to start to use direct printing. An interface control management unit 308 of the digital camera 30 accepts a user operation for starting to use direct printing, and starts direct printing (F701). When data to be printed is decided by a user operation (F702), the interface control management unit 308 of the digital camera 30 notifies a communication control unit 301 that direct printing is to start. To establish a communication path for transmitting/receiving print data, the communication control unit 301 controls a communication unit 302 to transmit a communication session establishment request to the printer 10 (F703).

In the printer 10, when a communication unit 202 receives the communication session establishment request (F703) from the digital camera 30, a communication control unit 201 determines whether it has established a communication session. If a communication session has been established, a communication session monitoring unit 203 determines whether the control command is continuously received at a predetermined time interval from the digital camera 20. Furthermore, the printer 10 monitors for the predetermined time interval whether the control command is received, and determines whether at least one control command has been received.

If the printer 10 receives a communication session establishment request from another apparatus when the control command is not continuously received at the predetermined time interval or when no control command has been received within the predetermined time interval, it determines that the currently established communication session may be disconnected. In this case, to deal with the communication session establishment request from the apparatus (digital camera 30) other than the partner apparatus (for example, the digital camera 20) with which the communication session has been established, it is decided to disconnect the established communication session (F704). The processing sequence of the digital camera and printer after it is determined to disconnect the communication session (F704) is the same as that in F415 to F426 of FIG. 4B in the first embodiment, and a description thereof will be omitted.

On the other hand, even if the control command has been received within the predetermined period of time, it may be decided to disconnect the communication session (F704). This case will be described below.

If the control command has been received within the predetermined period of time, the printer 10 refers to information about a communication protocol for the received communication session establishment request. The communication protocol information enables to specify whether it is possible to transfer print data according to the protocol immediately after a communication session is established. If, for example, a given communication protocol (to be referred to as a first communication protocol hereinafter) is used, no communication may be made for a given period even though a communication session is established since the user unregularly selects a photo after the communication session is established. The first communication protocol is specified as a protocol according to which a time (or its expected value) until transfer of print data is executed after the communication session is established is equal to or longer than a predetermined value, that is, it is impossible to transfer print data immediately after the communication session is established. On the other hand, if a file is selected, and a print button is pressed in a PC, print data to be transmitted has been decided before a communication session is established, and therefore, it is possible to transfer the print data immediately after the communication session is established. Thus, it can be specified that such printing by a PC is performed using another protocol (to be referred to as a second communication protocol hereinafter), according to which it is possible to transfer print data immediately after a communication session is established. Even if, therefore, the control command has been received from the digital camera 20 within the predetermined period of time, the communication session with the digital camera 20 is disconnected upon receiving a communication session establishment request according to the second communication protocol. A requested communication session according to the second communication protocol is then established. Even if the digital camera 30 requests to establish a communication session according to the first communication protocol, the communication session with the digital camera 20 may be disconnected to establish the communication session with the digital camera 30 when print data has been decided.

Based on the communication protocol information, therefore, the printer 10 determines whether data (print data) to be transferred has been decided in the communication apparatus (the digital camera 30) when it transmits a communication session establishment request. If, for example, the communication protocol is the first communication protocol, it is specified that image data to be transferred has not been decided when the communication session establishment request is transmitted. On the other hand, if the communication protocol is the second communication protocol according to which a communication session is established after a print target is decided in a PC, it can be specified that image data to be transferred has been decided when a communication session establishment request is transmitted. If whether data to be transferred has been decided cannot be determined only based on designation of the communication protocol, it may be considered that data to be transferred has not been decided. Instead of the communication protocol information, for example, information directly specifying whether print data to be transferred has been decided may be contained. Furthermore, information which enables to estimate a real time to be taken to transfer the data, such as the size of the print data to be transferred may be contained.

With the above operation, when the printer 10 communicates with the digital camera 20, it can identify the state of the communication session with the digital camera 20 (whether the communication session is in a disconnectable state), and disconnect the communication session on its own. This prevents the digital camera 20 from occupying the communication resources of the printer 10. Consequently, it is possible to share the print resources of the printer 10 between the digital cameras 20 and 30. Furthermore, by notifying the digital camera 20 of information such as a reason for the disconnection at this time, the digital camera 20 can execute a subsequent necessary control operation based on the received information.

Even if the control command has been received within a predetermined period of time, it is possible to disconnect an active communication session, and assign communication resources to a new communication session when there is no probability that the new communication session wastefully occupies the communication resources. In this case, it is possible to ensure that a period of time during which the new communication session occupies the communication resources is short, and thus the digital camera 20 can immediately reconnect the communication session. As a result, it becomes possible to efficiently establish a communication session between one apparatus (the printer 10) and a plurality of apparatuses (the digital cameras 20 and 30), thereby sharing the resources.

(Operation of Digital Camera)

A processing procedure for the operation of the digital camera is the same as that in the first embodiment except for a timing of transmitting a communication session start request (a communication session establishment request is transmitted after print data is decided), and a description thereof will be omitted.

(Operation of Printer)

Figure 8:
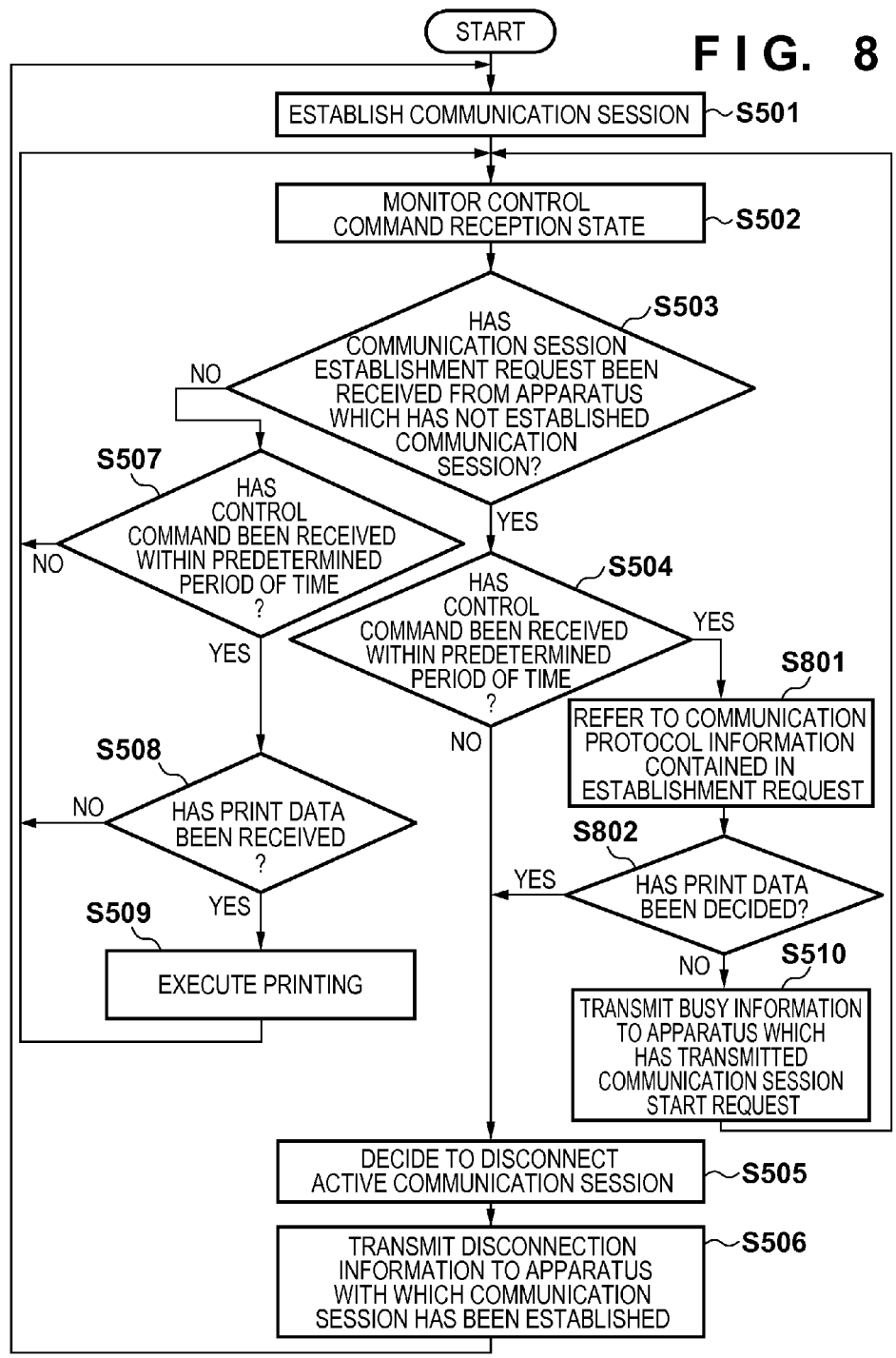
FIG. 8 is a flowchart illustrating the operation of the printer according to the second embodiment.

FIG. 8 is a flowchart illustrating the operation processing procedure of the printer 10 according to the embodiment. Since operations in steps S501 to S510 in this procedure are the same as those in the first embodiment, a description thereof will be omitted and only different points will be described.

In this embodiment, if it is determined in step S504 that the control command has been received within a predetermined period of time (YES in step S504), the communication control unit 201 refers to communication protocol information contained in a communication session establishment request (step S801). The communication protocol information enables to specify whether it is possible to transfer print data according to the protocol immediately after a communication session is established. If, for example, a given communication protocol (to be referred to as a first communication protocol hereinafter) is used, no communication may be made for a given period even though a communication session is established since the user unregularly selects a photo after the communication session is established. The first communication protocol can be specified as a protocol according to which a time (or its expected value) until transfer of print data is executed after the communication session is established is equal to or longer than a predetermined value, that is, it is impossible to transfer print data immediately after the communication session is established. On the other hand, if a file is selected, and a print button is pressed in a PC, print data to be transmitted has been decided before a communication session is established, and therefore, it is possible to transfer the print data immediately after the communication session is established. Thus, it can be specified that such printing by a PC is performed using another protocol (to be referred to as a second communication protocol hereinafter), according to which it is possible to transfer print data immediately after a communication session is established.

Based on the communication protocol information, therefore, the printer 10 determines whether data (print data) to be transferred has been decided in the communication apparatus (the digital camera 30) when it transmits a communication session establishment request (step S802). Note that if the communication protocol is the first communication protocol, it can be specified that image data to be transferred has not been decided when the communication session establishment request is transmitted. On the other hand, if the communication protocol is the second communication protocol according to which a communication session is established after a print target is decided in a PC, it can be specified that image data to be transferred has been decided when a communication session establishment request is transferred. If whether data to be transferred has been decided cannot be determined only based on designation of the communication protocol, it may be considered that data to be transferred has not been decided. Instead of the communication protocol information, for example, information directly specifying whether print data to be transferred has been decided may be contained. Furthermore, information which enables to estimate a real time to be taken to transfer the data, such as the size of the print data to be transferred may be contained.

If data (print data) to be transferred has been decided when the communication session establishment request is transmitted (YES in step S802), it can be determined that there is no time or a short enough time during which a new communication session wastefully occupies the communication resources. In this case, therefore, the printer 10 disconnects an active communication session (step S505). Processing procedure after step S505 is the same as that in FIG. 5 in the first embodiment.

On the other hand, if it is determined that data (print data) to be transferred has not been decided when the communication session establishment request is transmitted (NO in step S802), it can be determined that a period of time during which a new communication session wastefully occupies the communication resources may be long. In this case, therefore, the printer 10 maintains the active communication session without disconnecting it. The printer 10 then transmits BUSY information to the apparatus (digital camera 30) which has transmitted the communication session start request (step S510), and refuses establishment of a communication session. Note that the printer 10 may estimate a real time to be taken to transfer data, and determine based on the estimated value whether to disconnect the established communication session. Processing procedure after step S510 is the same as that in the first embodiment.

Note that it may be determined based on the communication protocol information in step 5802 whether the expected value of the time until transfer of print data is executed after the communication session is established is equal to or smaller than the predetermined value. Note that the determination operation corresponds to determining whether the expected value of a time during which the apparatus (digital camera 30) that has transmitted the session establishment request wastefully occupies the communication resources after the communication session is established is equal to or smaller than the predetermined value. In this case, if the expected value of the time until transfer of print data is executed after the communication session is established is equal to or smaller than the predetermined value, the printer 10 disconnects the currently established communication session (step S505). Alternatively, if the expected value of the time until transfer of print data is executed after the communication session is established is larger than the predetermined value, the printer 10 does not disconnect the current communication session, and transmits BUSY information to the digital camera 30 (step S510).

In step S802, based on the communication protocol information and accompanying information about data to be transferred, the printer 10 may estimate a real time to be taken to transfer the data, and determine whether the estimated value is equal to or smaller than the predetermined value. If, for example, data to be transmitted has been decided, the size of the data is very large, and it takes an enormous time to transfer the data, the current communication session need not be preferentially disconnected. On the other hand, if the data size is small enough, and a time to be taken to transfer the data is equal to or shorter than the predetermined value, the current communication session may be disconnected, and the data may be preferentially transferred with a new communication session.

With the above operation, even if the control command has been received within the predetermined period of time, it is possible to disconnect an active communication session, and assign communication resources to a new communication session when there is no probability that the new communication session wastefully occupies the communication resources. In this case, it is possible to ensure that a period of time during which the new communication session occupies the communication resources is short, and thus the digital camera 20 can immediately reconnect the communication session. As a result, it becomes possible to efficiently establish a communication session between one apparatus (the printer 10) and a plurality of apparatuses (the digital cameras 20 and 30), thereby sharing the resources.

<<Third Embodiment>>

(Network Configuration)

In this embodiment, still another communication session disconnection method according to information about a communication protocol for a received communication session establishment request will be described. The communication protocol information is used to determine whether it is possible to transfer print data according to the protocol immediately after a communication path for transmitting/receiving print data is established.

Note that a network configuration, the configuration of a printer, and the configuration of a digital camera in this embodiment are the same as those in the first embodiment, and a description thereof will be omitted.

(Operation of Printer and Digital Camera)

Figure 9:
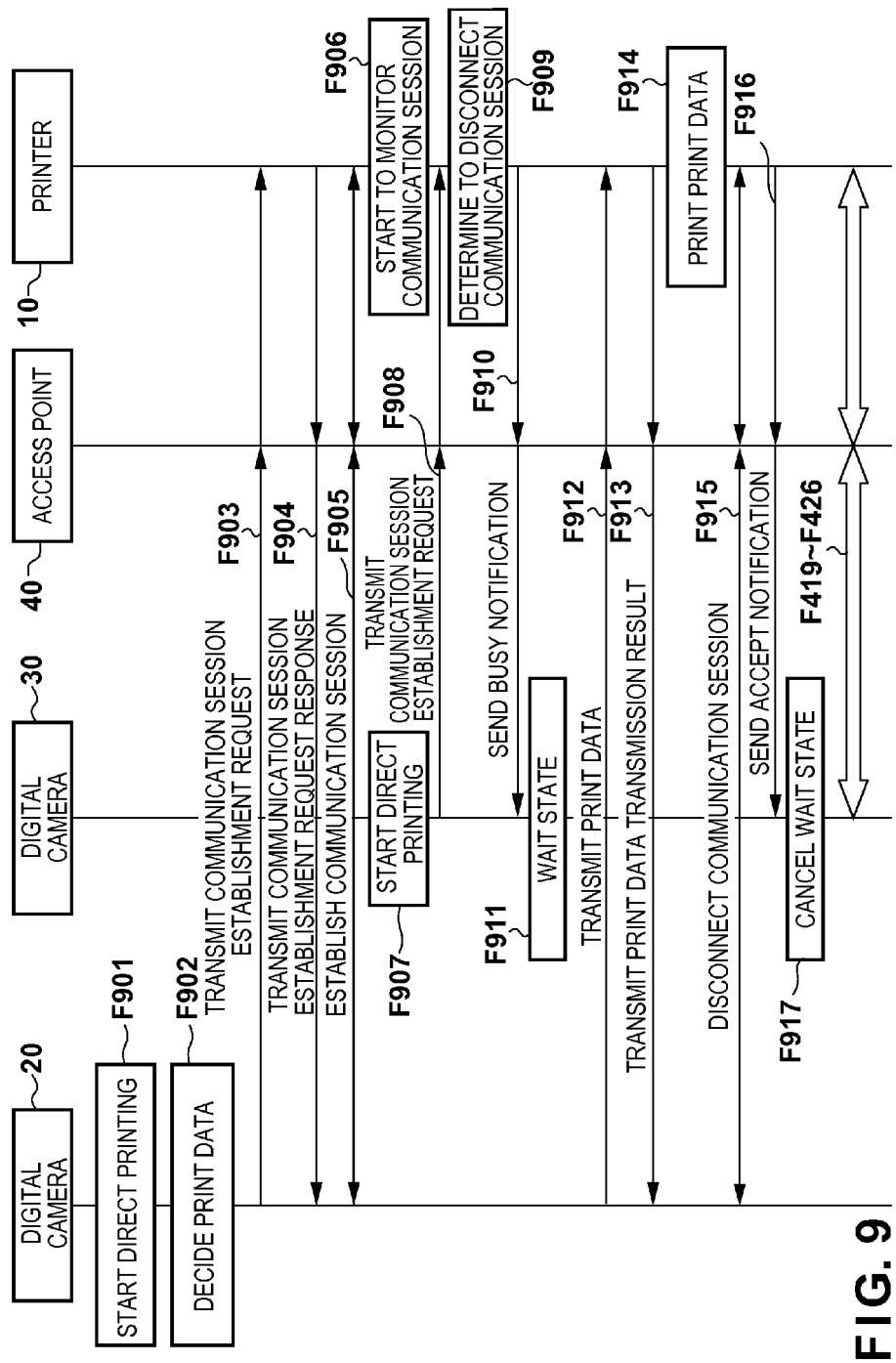
FIG. 9 is a sequence chart showing processing between a printer and a plurality of digital cameras according to the third embodiment.

An operation of establishing and disconnecting a communication session between a printer 10 and a digital camera 20 or 30 according to this embodiment will be described with reference to a sequence chart shown in FIG. 9. An interface control management unit 308 of the digital camera 30 accepts a user operation for starting to use direct printing, and starts direct printing (F901). When data to be printed is decided by a user operation (F902), the interface control management unit 308 of the digital camera 30 notifies a communication control unit 301 that direct printing is to start. To establish a communication path for transmitting/receiving print data, the communication control unit 301 of the digital camera 30 controls a communication unit 302 to transmit a communication session establishment request to the printer 10 (F903).

Note that in this embodiment, each of the printer 10 and digital cameras 20 and 30 has already established wireless LAN connection with an access point 40. At this time, however, wireless LAN connection need not have been established, and connection in a lower communication layer such as a wireless LAN and a higher communication layer such as TCP/IP, PTP, or PTP-IP may be collectively established in response to a communication session establishment request. Although a communication session indicates PTP-IP connection in this embodiment, other communication protocols may be used.

In the printer 10, when a communication unit 202 receives the communication session establishment request (F903) from the digital camera 20, a communication control unit 201 returns a communication session establishment request response to the digital camera 20 (F904). A communication session is then established between the digital camera 20 and the printer 10 (F905). After the communication session between the printer 10 and the digital camera 20 is established, the communication control unit 201 of the printer 10 controls a communication session monitoring unit 203 to start to monitor the state of the communication session (F906).

A case in which the user of the digital camera 30 operates the digital camera 30 to start to use direct printing in this state will now be described. The interface control management unit 308 of the digital camera 30 accepts a user operation for starting to use direct printing, and starts direct printing (F907). Note that the interface control management unit 308 notifies the communication control unit 301 that the user operation has been accepted and direct printing is to start. To establish a communication path for transmitting/receiving print data, the communication control unit 301 of the digital camera 30 controls the communication unit 302 to transmit a communication session establishment request to the printer 10 (F908). A communication session establishment request may be transmitted upon start of a direct printing application, or may be transmitted after deciding data to be printed.

When the communication control unit 201 receives a communication session establishment request, the printer 10 refers to information about the communication protocol of the currently established communication session. The communication protocol information enables to specify whether it is possible to transfer print data according to the protocol immediately after a communication session is established. The specifying method is the same as that in the second embodiment, and a detailed description thereof will be omitted.

Based on the communication protocol information, the printer 10 determines whether the communication protocol is such that data (print data) to be transferred in the currently established communication session has been decided. If a communication protocol according to which data (print data) to be transferred in the currently established communication session has been decided is used, the printer 10 decides to maintain the current communication session. If a communication protocol according to which data (print data) to be transferred in the currently established communication session has not been decided is used, it is determined whether to disconnect the communication session, similarly to the first and second embodiments (F909).

In the printer 10, when the communication unit 202 receives a communication session establishment request from the digital camera 30 (F908), the communication control unit 201 determines whether the communication protocol of the currently established communication session is such that data (print data) to be transferred has been decided. If the communication protocol of the currently established communication session is a communication protocol according to which data (print data) to be transferred has been decided, the printer 10 sends BUSY notification to the apparatus (digital camera 30) which has transmitted the communication session establishment request (F910). Note that the BUSY notification indicates to maintain the currently established communication session.

Upon receiving the BUSY information from the printer 10 via the communication unit 302, the digital camera 30 transits to a wait state until the communication session of the printer 10 is freed (F911). At this time, the digital camera 30 may execute communication session restart processing when a predetermined period of time elapses. In this case, the digital camera 30 sets a wireless communication function in a power saving state until a communication session restart time comes, and then executes communication session reconnection processing after the restart time. Furthermore, the digital camera 30 may stand by for the printer 10 to regularly polling a communication session establishment request, or may terminate the print application. If the printer 10 sends a communication session establishment request, the digital camera 20 may stand by for the request.

The digital camera 20 transmits, to the printer 10 via the communication unit 302, print data which has been selected by a user operation or the like (F912). When the communication unit 202 receives the print data from the digital camera 20, the printer 10 transmits a print data transmission result to the digital camera 20 via the communication unit 202 (F913). If the received print data can be printed, the printer 10 causes a printer function unit 204 to print the print data (F914). After disconnecting the communication session with the digital camera 20 (F915), the printer 10 notifies, via the communication unit 202, the digital camera 30 of accept information, that is, a message which causes to establish a communication session (F915). The digital camera 30 cancels the wait state (F917), and establishes a communication session with the printer 10. A procedure of establishing the communication session between the printer 10 and the digital camera 30 is the same as that in F419 to F426 of FIG. 4B described in the first embodiment, and a description thereof will be omitted.

With the above operation, when there is no probability that a current communication session wastefully occupies communication resources, it is possible to maintain the active communication session, and assign the communication resources to a new communication session after disconnecting the current communication session. In this case, it is possible to ensure that a period of time during which the new communication session occupies the communication resources is short, and therefore, it becomes possible to efficiently establish a communication session between one apparatus (the printer 10) and a plurality of apparatuses (the digital cameras 20 and 30), thereby sharing the resources.

(Operation of Digital Camera)

A processing procedure for the operation of the digital camera is the same as that shown in FIG. 6 in the first embodiment, and a description thereof will be omitted.

(Operation of Printer)

FIG. 10 is a flowchart illustrating the operation processing procedure of the printer 10 according to the embodiment. When the processing starts, the communication control unit 201 transmits a communication session establishment request response to a communication apparatus (the digital camera 20 in the embodiment) as the transmission source of a communication session establishment request via the communication unit 202. With this operation, the printer 10 establishes a communication session with the communication apparatus (digital camera 20) (step S1001). When the communication control unit 201 receives the communication session establishment request, the printer 10 refers to information about a communication protocol for a currently established communication session. The communication protocol information enables to specify whether it is possible to transfer print data according to the protocol immediately after a communication session is established. Details of the information are the same as those described above, and a detailed description thereof will be omitted.

The printer 10 determines whether print data has been received (step S1002). If print data has been received (YES in step S1002), the printer 10 executes printing (step S1003). Upon execution of printing, the printer 10 disconnects the established communication session (step S1004).

On the other hand, the communication control unit 201 determines whether a communication session establishment request for establishing a communication path has been received from another communication apparatus (the digital camera 30) via the communication unit 202 during execution of printing (step S1005). That is, the unit 201 determines whether there is a communication apparatus for which print processing is held.

If a communication session establishment request for establishing a communication path has been received from the other communication apparatus (the digital camera 30) during execution of printing (YES in step S1005), the printer 10 notifies the digital camera 30 of accept information (step S1006). That is, the printer 10 notifies the communication apparatus for which print processing is held that a communication session is free. After notifying the digital camera 30 of the accept information, the printer 10 establishes a communication session with the digital camera 30 (step S1007), and executes the print processing.

On the other hand, if it is determined in step S1002 that no print data has been received (NO in step S1002), the printer 10 determines whether a communication session establishment request has been received from the other communication apparatus (digital camera 30) (step S1008). That is, if print processing is not complete, the printer 10 determines whether a communication session establishment request has been received from the other communication apparatus (digital camera 30).

Based on the communication protocol information, the printer 10 determines whether the communication protocol is such that data (print data) to be transferred in the currently established communication session has been decided. If a communication protocol according to which data (print data) to be transferred in the currently established communication session has been decided is used, the printer 10 decides to maintain the current communication session. In this case, the printer 10 sends BUSY information to the apparatus (digital camera 30) which has transmitted the communication session establishment request, that is, notifies the apparatus that the currently established communication session is maintained (step S1009).

With the above operation, when there is no probability that a current communication session wastefully occupies communication resources, it is possible to maintain the active communication session, and assign the communication resources to a new communication session after disconnecting the current communication session. In this case, it is possible to ensure that a period of time during which the communication session occupies the communication resources is short, and therefore, it becomes possible to efficiently establish a communication session between one apparatus (the printer 10) and a plurality of apparatuses (the digital cameras 20 and 30), thereby sharing the resources.

According to the present invention, it is possible to provide a communication apparatus which prevents one partner apparatus from occupying its communication resources, a control method, and a program.

<<Other Embodiment>>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-246860, filed Nov. 10, 2011 and 2012-194410, filed Sep. 4, 2012, which are hereby incorporated by reference herein in their entirety.

What is claimed is:

1. A communication apparatus comprising:
a CPU coupled to a memory, wherein the CPU performs control of a reception unit and a control unit;
the reception unit receiving, from a first apparatus which has established a communication session, a control signal indicating a state in which the communication session should be maintained, wherein the control signal is different from a signal including non-control data to be transmitted from the first apparatus to the communication apparatus; and
the control unit disconnecting the communication session with the first apparatus, if the control signal is not received from the first apparatus within a predetermined period of time while the communication session with the first apparatus is established, and a communication session establishment request is received from a second apparatus, regardless of whether or not the signal including non-control data is received within the predetermined period,
wherein the control unit does not disconnect the communication session with the first apparatus, if the request is not received from the second apparatus regardless of whether or not the control signal is received within the predetermined period of time.

2. The apparatus according to claim 1, wherein
if the request is received from the second apparatus before the predetermined period of time elapses after the control signal is received from the first apparatus, said control unit maintains the communication session with the first apparatus.

3. The apparatus according to claim 1, wherein
if the request is received from the second apparatus before the predetermined period of time elapses after the control signal is received from the first apparatus, said control unit does not establish a communication session with the second apparatus.

4. The apparatus according to claim 1, wherein
if the control signal is not received from the first apparatus within the predetermined period of time while the communication session with the first apparatus is established, and a communication session establishment request is received from the second apparatus, said control unit disconnects the communication session with the first apparatus according to a communication protocol used for communication with the second apparatus.

5. The apparatus according to claim 1, wherein
if the control signal is not received from the first apparatus within the predetermined period of time while the communication session with the first apparatus is established, and a communication session establishment request is received from the second apparatus, said control unit disconnects the communication session with the first apparatus according to a determination status of data to be used for predetermined processing with the second apparatus.

6. The apparatus according to claim 1, further comprising a notification unit configured to notify, if said control unit disconnects the established communication session, the first apparatus of a reason for the disconnection.

7. The apparatus according to claim 6, wherein said notification unit notifies the first apparatus of information for reconnection of the communication session in addition to the reason for the disconnection.

8. The apparatus according claim 1, further comprising a determination unit configured to determine, if a communication session establishment request is received from another apparatus while the communication session with the first apparatus is established, whether data to be transmitted/received in the communication session with the first apparatus has been decided, and a notification unit configured to notify, if said determination unit determines that data to be transmitted/received in the communication session with the first apparatus has been decided, the other apparatus that the communication session with the first apparatus is maintained.

9. The apparatus according to claim 8, wherein when transmission/reception of data in the communication session with the first apparatus is complete, said apparatus disconnects the communication session.

10. A control method for a communication apparatus, comprising:
receiving, from a first apparatus which has established a communication session, a control signal indicating a state in which the communication session should be maintained, wherein the control signal is different from a signal including non-control data to be transmitted from the first apparatus to the communication apparatus; and
disconnecting the established communication session, if the control signal is not received from the first apparatus within a predetermined period of time while the communication session with the first apparatus is established, and a communication session establishment request is received from a second apparatus, regardless of whether or not the signal including non-control data is received with the predetermined period,
wherein the communication session with the first apparatus is not disconnected, if the request is not received from the second apparatus regardless of whether or not the control signal is received within the predetermined period of time.

11. A non-transitory computer-readable storage medium storing a computer program for causing, in a communication apparatus, a computer to execute
receiving, from a first apparatus which has established a communication session, a control signal indicating a state in which the communication session should be maintained, wherein the control signal is different from a signal including non-control data to be transmitted from the first apparatus to the communication apparatus, and
disconnecting the established communication session, if the control signal is not received from the first apparatus within a predetermined period of time while the communication session with the first apparatus is established, and a communication session establishment request is received from a second apparatus, regardless of whether or not the signal including non-control data is received within the predetermined period,
wherein the communication session with the first apparatus is not disconnected, if the request is not received from the second apparatus regardless of whether or not the control signal is received within the predetermined period of time.

* * * * *